United States Patent [19]
Erbes

[11] Patent Number: 6,067,338
[45] Date of Patent: May 23, 2000

[54] REACTOR CORE SHROUD REPAIR USING THERMALLY TENSIONED LINKS TO APPLY COMPRESSION ACROSS SHROUD VERTICAL SEAM WELD

[75] Inventor: John Geddes Erbes, Mt. View, Calif.

[73] Assignee: General Electric Company, San Jose, Calif.

[21] Appl. No.: 08/804,722

[22] Filed: Feb. 21, 1997

[51] Int. Cl.⁷ ................................................ G21C 19/00
[52] U.S. Cl. ..................... 376/302; 376/260; 376/287; 29/402.15
[58] Field of Search ..................... 376/260, 287, 376/285, 302; 29/429.15, 429.17; 411/55, 57, 60, 61; 220/235–236

[56] References Cited

U.S. PATENT DOCUMENTS

| | | | |
|---|---|---|---|
| 3,469,865 | 9/1969 | Ellenburg | 285/330 |
| 4,115,203 | 9/1978 | Naevestad | 202/248 |
| 4,574,971 | 3/1986 | Leonard | 220/235 |
| 5,102,612 | 4/1992 | McDonald et al. | 376/203 |
| 5,392,322 | 2/1995 | Whitling et al. | 376/260 |
| 5,521,951 | 5/1996 | Charnley et al. | 376/260 |
| 5,530,219 | 6/1996 | Offer et al. | 219/137 R |
| 5,675,619 | 10/1997 | Erbes et al. | 376/302 |
| 5,729,581 | 3/1998 | Loock et al. | 376/260 |
| 5,737,379 | 4/1998 | Erbes | 376/302 |
| 5,742,653 | 4/1998 | Erbes et al. | 376/302 |
| 5,803,686 | 9/1998 | Erbes et al. | 411/55 |
| 5,905,771 | 5/1999 | Erbes et al. | 376/302 |

*Primary Examiner*—Charles T. Jordan
*Assistant Examiner*—Jack Keith
*Attorney, Agent, or Firm*—James E. McGinness; Dennis M. Flaherty

[57] ABSTRACT

An apparatus for repairing the core shroud of a nuclear reactor having one or more cracked vertical seam welds. The repair involves machining two holes in the shroud on opposing sides of the cracked vertical seam weld and then attaching two flexible links on the inside and outside of the shroud wall by means of two shear bolts inserted in the machined holes. The flexible links bridge the cracked vertical weld seam. Multiple link assemblies can be placed along the length of a crack. The links are made of an alloy having a coefficient of thermal expansion less than the coefficient of thermal expansion of the shroud material. The links are installed while the reactor is shutdown. When the reactor returns to operation, the consequent temperature rise causes the shroud section being bridged by the links to expand more than the links expand. As a result the links exert a circumferential compressive load across the crack in the vertical seam weld.

19 Claims, 6 Drawing Sheets

REACTOR CORE SHROUD REPAIR USING THERMALLY TENSIONED LINKS TO APPLY COMPRESSION ACROSS SHROUD VERTICAL SEAM WELD

FIELD OF THE INVENTION

This invention relates to maintenance and repair of nuclear reactors. In particular, the invention relates to the repair of the fuel core shroud of a boiling water reactor.

BACKGROUND OF THE INVENTION

A conventional boiling water reactor is shown in FIG. 1. Feedwater is admitted into a reactor pressure vessel (RPV) 10 via a feedwater inlet 12 and a feedwater sparger 14. The feedwater flows downwardly through the downcomer annulus 16, which is an annular region between RPV 10 and a core shroud 18. The core shroud 18 is a stainless steel cylinder which surrounds the nuclear fuel core 20, which is made up of a plurality of fuel bundle assemblies 22 (only two 2×2 arrays of which are shown in FIG. 1). Each array of fuel bundle assemblies is supported at the top by a top guide 24 and at the bottom by a core plate 26.

The water flows through downcomer annulus 16 to the core lower plenum 25. The water subsequently enters the fuel assemblies 22, wherein a boiling boundary layer is established. A mixture of water and steam enters the core upper plenum under the shroud head 28. The steam-water mixture flows through standpipes 30 and enters steam separators 32.

The BWR also includes a coolant recirculation system which provides the forced convection flow through the core necessary to attain the required power density. A portion of the water is sucked from the lower end of the downcomer annulus 16 via recirculation water outlet 34 and forced by a centrifugal recirculation pump (not shown) into jet pump assemblies 36 (only one of which is shown) via recirculation water inlets 38. The jet pump assemblies are circumferentially distributed around the core shroud 18.

Stress corrosion cracking (SCC) is a known phenomenon occurring in reactor components, such as structural members, piping, fasteners, and welds, exposed to high-temperature water. The reactor components are subject to a variety of stresses associated with, e.g., differences in thermal expansion, the operating pressure needed for the containment of the reactor cooling water, and other sources such as residual stress from welding, cold working and other inhomogeneous metal treatments. In addition, water chemistry, welding, heat treatment, and radiation can increase the susceptibility of metal in a component to SCC.

In particular, stress corrosion cracking has been found in the vertical seam welds or heat affected zones thereof in the core shroud 18. This diminishes the structural integrity of the shroud, which vertically and horizontally supports core top guide 24 and shroud head 28. Thus, there is a need for a method and an apparatus for repairing a shroud which has cracks in or near the vertical seam welds.

SUMMARY OF THE INVENTION

The present invention is an apparatus for repairing a shroud in which one or more vertical seam welds have experienced SCC. The repair involves the attachment of a pair of links to the shroud, during shutdown of the reactor, so that the links bridge the cracked vertical weld seam, thereby allowing transmission of seismic shear and pressure loads across the joint. The links are designed to support adjoining parts of the shroud on opposing sides of the cracked weld area, replacing the structural function of the vertical weld. The links also serve to limit the amount of fluid which flows through a crack from the relatively higher-pressure interior of the shroud to the relatively lower-pressure exterior of the shroud, i.e., the downcomer annulus.

In accordance with the invention, the links are made of a material having a coefficient of thermal expansion which is less than the coefficient of thermal expansion of the shroud material. The reactor is at a relatively low temperature, e.g., about 100° F., when the links are installed. When the reactor, with links installed, resumes operation, the temperature inside the reactor rises to about 530° F. During this temperature rise, the shroud and links undergo differential thermal expansion, to wit, the portion of the shroud bridged by the links expands more than the links. As a result, the links are tensioned and apply a circumferential compressive force across the vertical seam weld. The magnitude of the circumferential compressive force is a function of the respective coefficients of thermal expansion, the respective temperature increases, the distance bridged by the links and the spring constant of the links.

In accordance with the invention, the links are attached to the shroud by a pair of shear bolts. Each link is fastened to the shroud to the left and to the right of the vertical seam weld so that the links bridge the seam weld. Multiple pairs of links can be placed along the length of a crack. Each cracked shroud seam weld can be repaired independently.

In accordance with a preferred embodiment of the invention, the links connecting the pair of shear bolts are not straight. As a result, the tensile forces on the ends of each link cause the link to flex. The flexibility of the links can be controlled by proper design of the link configuration. Flexure of the links during differential thermal expansion of the links and shroud has the effect of reducing the compressive load as compared to the compression which more rigid links would apply across the vertical seam weld.

The shroud repair links in accordance with the present invention are designed to withstand the thermal and radiological conditions which the shroud is subjected to. Further, the shroud repair links are designed and installed such that removal of jet pump inlet mixers and RPV beltline inspection can be performed without removing the repair links.

In accordance with the preferred embodiment of the invention, one link (hereinafter referred to as the "splice link") has a circular unthreaded hole at each end for receiving an unthreaded intermediate portion of the shaft of a respective one of the shear bolts, and the other link (hereinafter referred to as the "nut link") has a circular threaded hole at each end for receiving a threaded distal end of the shaft of a respective one of the shear bolts. The play between the unthreaded intermediate portion of the bolt shaft and the unthreaded hole in the shroud must be minimized in order to minimize leakage of fluid through the hole.

A corresponding pair of circular unthreaded holes are machined in parallel in the shroud wall at positions which will be aligned with the holes in the links when the latter are correctly positioned on the inside and outside of the shroud. A respective shear bolt is installed in each set of aligned holes, with the threaded portion of each shear bolt threadably engaged with the corresponding threaded hole in the nut link. The shear bolts have hexagonal heads which are tightened remotely to press the nut and splice links against the shroud wall.

In accordance with a further feature of the invention, a locking assembly is installed in an annular recess bounded by the head, shaft and built-in washer of the shear bolt and the opposing surface of the splice link. This locking assembly is designed to allow the bolt to rotate in the direction of bolt tightening while preventing loosening of the bolt, e.g., due to vibrations during reactor operation. The preferred embodiment of the locking assembly includes a ratchet tooth washer having a pin which mates with a blind hole in the splice link and a lock washer having a tang which mates with a hole in the shear bolt head. The lock washer comprises a spring with a locking tooth at one end thereof. The locking tooth meshes with the ratchet teeth so that bolt loosening is prevented. The locking tang is connected to either end of the spring.

In the embodiment where the tooth and tang project from the same end of the spring, the tang is provided with a recess which can be grasped by a tool. The grasping tool can be manipulated remotely to pull the locking tooth out of engagement with the ratchet teeth on the tapered shank, thereby unlocking the shear bolt and allowing it to be loosened without damaging the lock washer.

All steps in the installation of the shroud repair links in accordance with the invention are performed remotely. Access to both the downcomer annulus and the inside of the shroud is required. The splice link can be installed either inside or outside the shroud, with the nut link installed on the opposite side of the shroud wall.

This shroud repair design is advantageous because it allows fast installation using a minimum number of fasteners and minimum in-vessel machining. All holes in the shroud are circular cylindrical so that machining the shroud holes is simplified. The links in accordance with the invention occupy little space, which minimizes the impact on other activities inside the reactor and permits installation and use in conjunction with other repairs for horizontal welds. The number of links installed along a given seam weld can be determined based on the space available and the magnitude of the seismic loads anticipated.

DETAILED DESCRIPTION OF THE PREFERRED EMBODIMENTS

Figure 1:
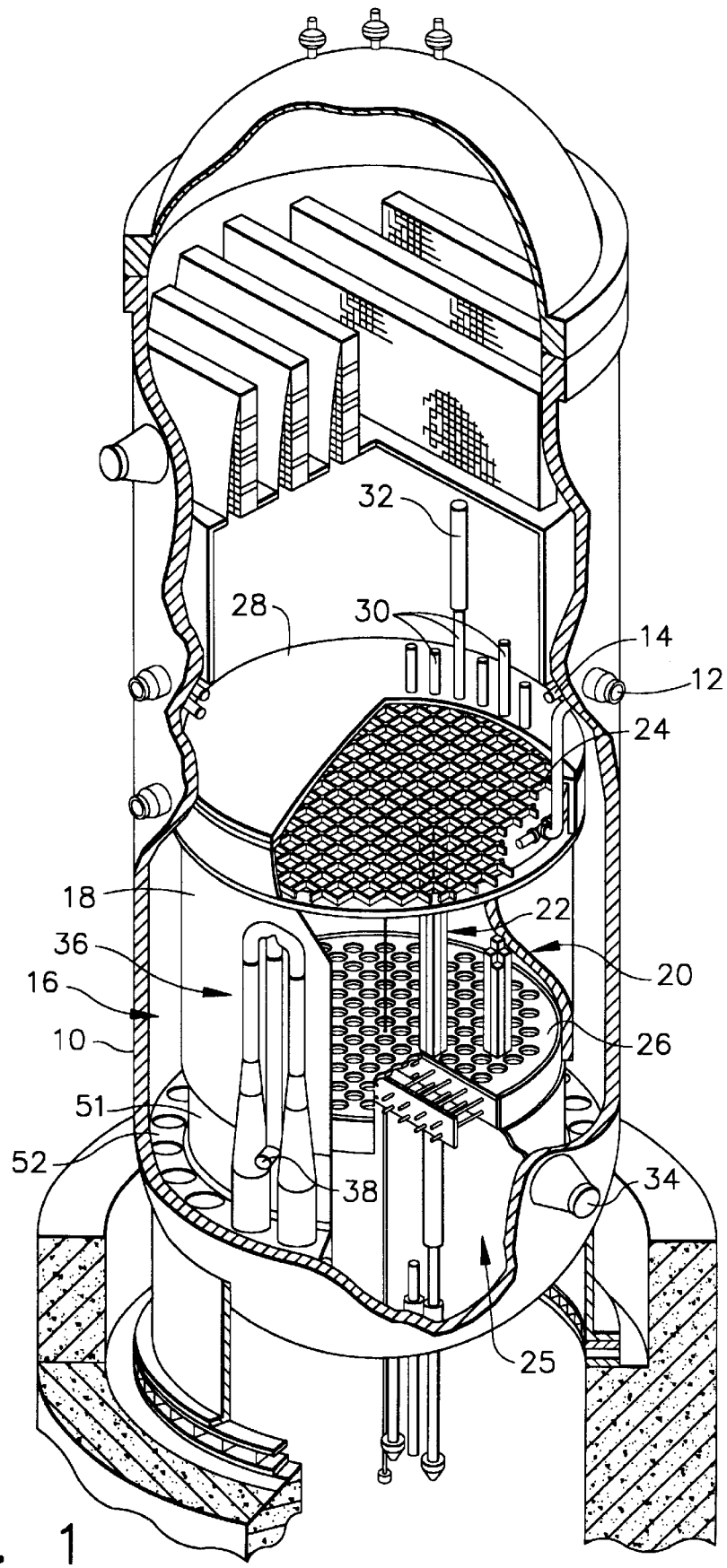
FIG. 1 is a schematic showing a partially cutaway perspective view of a conventional BWR.
Figure 2:
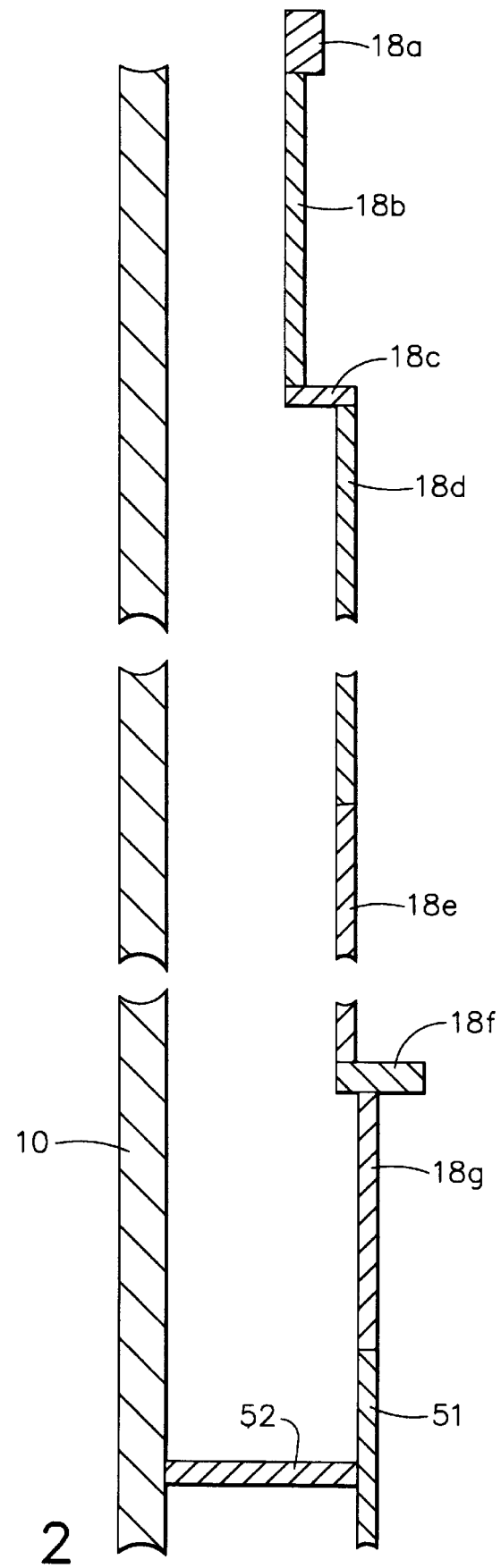
FIG. 2 is a schematic showing a sectional view of a portion of one type of BWR core shroud.

Referring to FIG. 2, one type of core shroud 18 comprises a shroud flange 18a for supporting the shroud head 28; a circular cylindrical upper shell section 18b welded to shroud head flange 18a; an annular top guide support ring 18c welded to upper shell section 18b; circular cylindrical top, middle and bottom mid-core shell sections 18d, 18h and 18e, with top section 18d welded to top guide support ring 18c and bottom section 18e welded to an annular core plate support ring 18f; and a lower shell section 18g welded to the core plate support ring 18f. The top, middle and bottom sections 18d, 18h and 18e of the mid-core shell section are of equal diameter. The top mid-core shell section 18d is joined to the middle mid-core shell section 18h at an upper mid-plane girth weld 50a; the bottom mid-core shell section 18e is joined to the middle mid-core shell section 18h at a lower mid-plane girth weld 50b. The diameter of upper shell section 18b is greater than the diameter of the mid-core shell sections, which are in turn greater than the diameter of lower shell section 18g. The entire shroud is supported by shroud support 51, which is welded to the bottom of lower shell section 18f, and by annular shroud support plate 52, which is welded at its inner diameter to shroud support 51 and at its outer diameter to RPV 10. All of the aforementioned welds extend around the entire circumference of the shroud and constitute the shroud girth seam welds.

Each mid-core shell section (18d, 18e and 18h) consists of two 180° half-shell sections which are joined at a pair of vertical seam welds—welds 56a, 56b for top mid-core shell section 18d; welds 58a, 58b for middle mid-core shell section 18h; and welds 56c, 56d for bottom mid-core shell section 18e. The vertical seam welds 58a, 58b are azimuthally staggered relative to the vertical seam welds 56a–56d.

Stress corrosion cracking has been found in the shroud seam welds or heat affected zones thereof. In the case of cracked vertical seam welds, a plurality of flexible link assemblies in accordance with the present invention can be arranged along the weld length. Links may be installed only at vertical weld seams found to have cracking, or at all vertical weld seams to protect against future cracking. Each flexible link is fastened to the left and to the right of the vertical seam weld so that the link bridges that seam weld.

Figure 3:
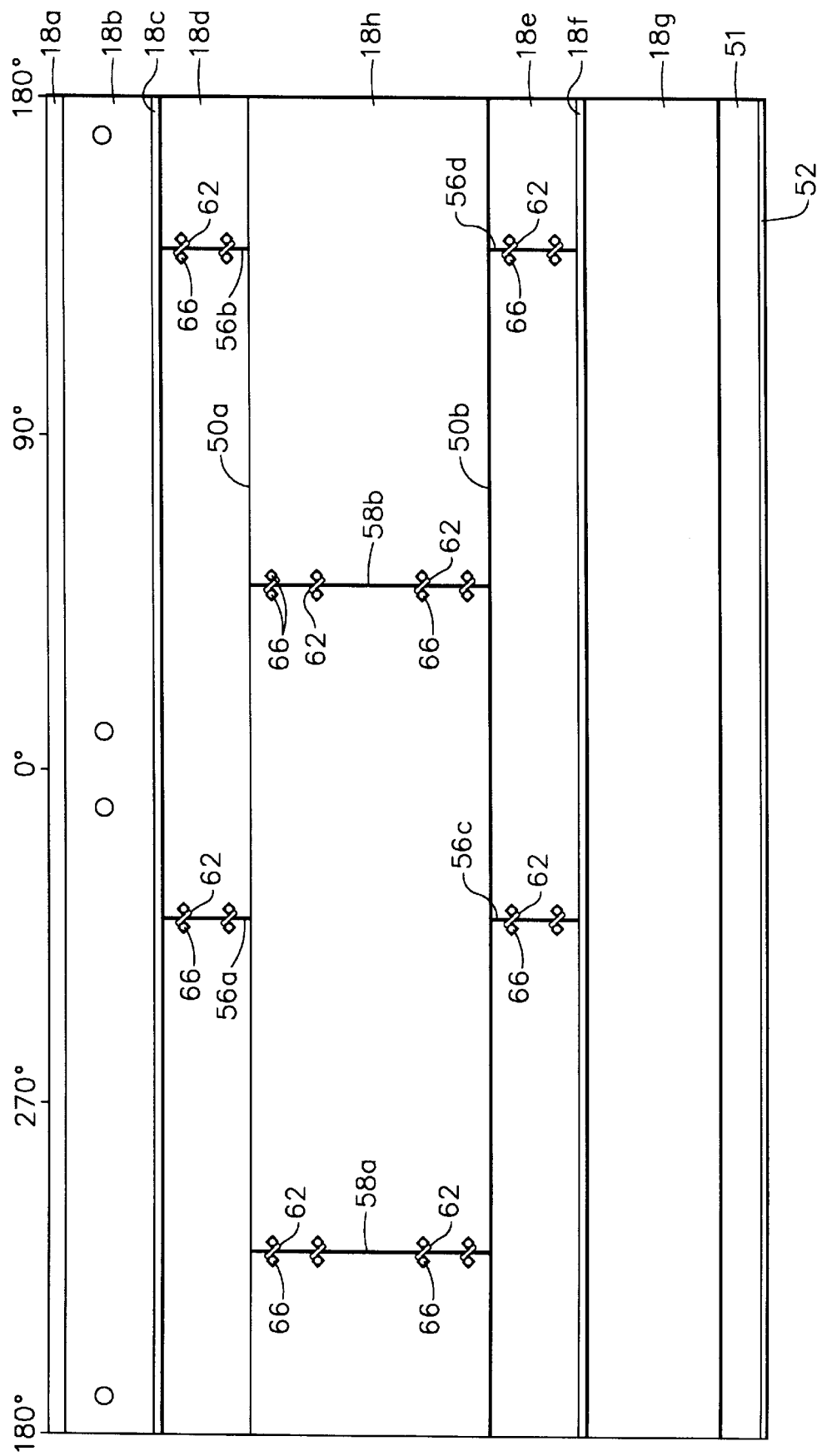
FIG. 3 is a schematic showing a developed azimuthal view of a BWR core shroud having vertical seam welds bridged by flexible links in accordance with one preferred embodiment of the invention.

In accordance with the preferred embodiment of the invention, flexible link assemblies 60 are arranged to bridge the vertical seam welds in the mid-core shell section of the shroud. As seen in FIG. 3, in accordance with one arrangement, each vertical seam weld 56a–56d is bridged by two flexible link assemblies and each vertical seam weld 58a and 58b is bridged by five flexible assemblies. The purpose of these flexible link assemblies is to exert a compressive load across the cracked vertical seam welds, thereby mitigating crack propagation and reinforcing the shroud.

Figure 4:
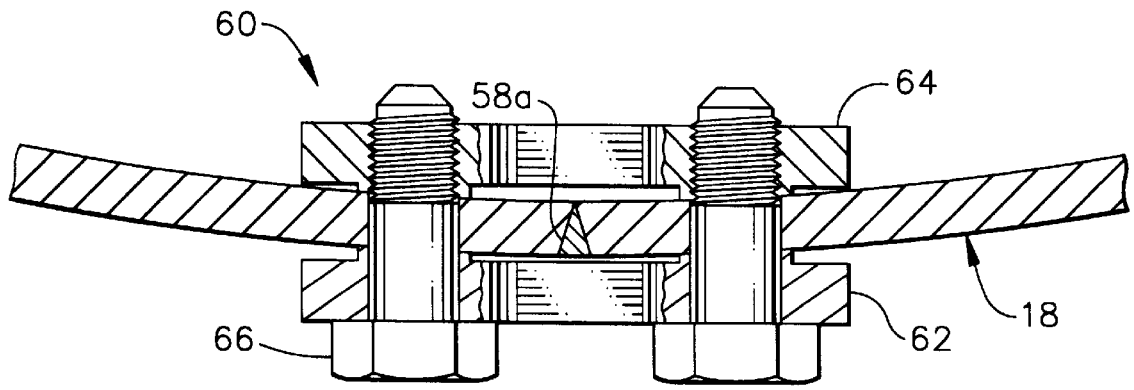
FIG. 4 is a schematic showing a sectional view of an installed vertical seam weld flexible link assembly in accordance with the preferred embodiment shown in FIG. 3.
Figure 5:
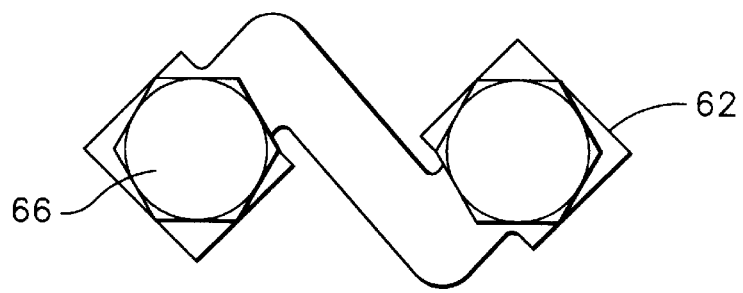
FIGS. 5 and 6 are schematics showing plan views, taken from the splice link side and the nut link side respectively, of a vertical seam weld flexible link assembly in accordance with the preferred embodiment shown in FIG. 3.
Figure 6:
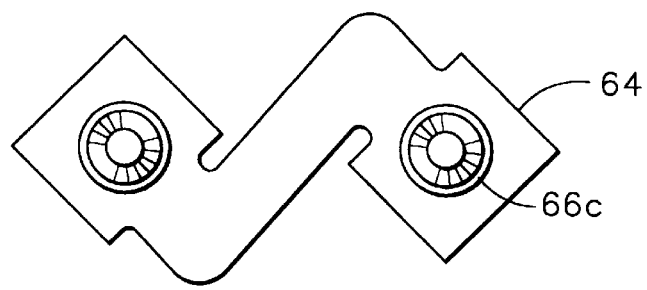

As seen in FIG. 4, each flexible link assembly 60 comprises a flexible splice link 62 fastened to the external surface of the shroud 18 by a pair of shear bolts 66 and a flexible nut link 64 fastened to the internal surface of shroud 18 by the same shear bolts 66. As seen in FIGS. 5 and 6, the links each have a dog-leg configuration formed by a pair of wishbone springs that share a common arm. When a tensile force is applied at the ends of each link by the shear bolts during differential thermal expansion of the shroud and the links, each of the wishbone springs can flex in the direction of extending the link. The desired amount of link extension will depend on the design specifications, which are specific to the particular reactor being repaired. By proper design of the flexible links, the optimum circumferential compressive thermal preloading can be produced across the vertical seam weld during startup of the reactor.

Figure 11:
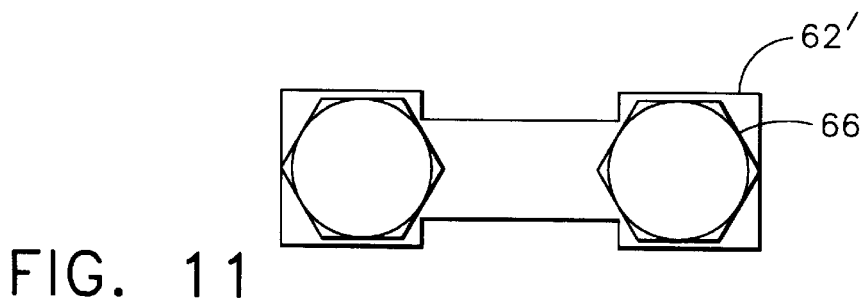
FIG. 11 is a schematic showing a plan view, taken from the splice link side, of a vertical seam weld flexible link assembly in accordance with another preferred embodiment of the invention.

Alternatively, straight links 62' (see FIG. 11) made of an alloy having a coefficient of thermal expansion less than that of the shroud material can be used. In this case, the circumferential compressive thermal preloading applied across the vertical seam weld is not a function of the shape of the links and the links do not act as springs.

Figure 7:
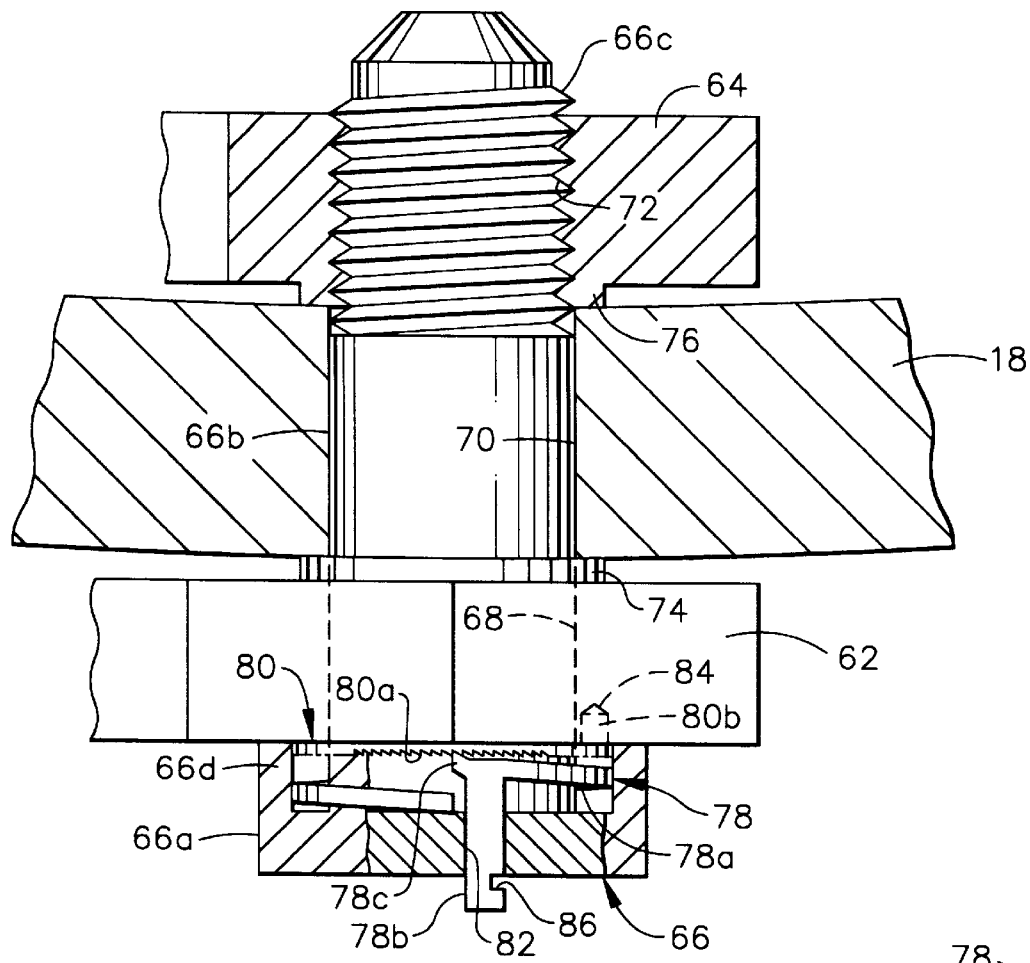
FIG. 7 is a schematic showing a detailed sectional view of an installed vertical seam weld flexible link assembly in accordance with the preferred embodiment shown inn FIGS. 4–6.

The structural details of the fastening arrangement in accordance with the preferred embodiment of the invention are shown in FIG. 7. The splice link 62 has an unthreaded hole 68 at each end. Preferably, holes 68 are circular cylindrical with mutually parallel centerlines. Each unthreaded hole 68 in the splice link 62 is penetrated by the unthreaded portion 66b of the shaft of a respective shear bolt 66. The difference in diameter of the shaft portion 66b and the hole 68 should be as small as practical in order to minimize the leakage of fluid through the hole. Similarly, a pair of unthreaded holes 70 are machined into the shroud, e.g., by remote-controlled electric discharge machining, on opposite sides of the vertical seam weld 58a. The unthreaded holes 70 also have mutually parallel centerlines and diameters equal to the diameter of hole 68 in the splice link. The centerlines of holes 70 must be separated by a distance equal to the distance which separates the centerlines of holes 68 in the splice link. Each unthreaded hole 70 in the shroud 18 is penetrated by the unthreaded shaft portion 66b of a respective shear bolt 66. Finally, nut link 64 has a threaded hole 72 at each end. The threaded holes have mutually parallel centerlines separated by a distance equal to the distance separating the centerlines of holes 68 in the splice link 62.

Each threaded hole 72 in the nut link 64 threadably engages a threaded portion 66c of the shaft of a respective shear bolt 66. The splice link and nut link are held fast against the shroud wall by tightening the shear bolts until the links are held against the shroud wall with the desired compressive preload. The compressive preload is transmitted to the shroud wall via raised bearing pads formed on the splice and nut links. The splice link 62 has raised bearing pads 74 which extend around the periphery of holes 68 in the splice link. Similarly, the nut link 64 has raised bearing pads 76 which extend around the periphery of holes 72 in the nut link. These pads allow local machining to precisely match the contact surface of the link to the curved internal surface of the shroud wall.

A tool with a hexagonal socket is coupled to the hexagonal head 66a of shear bolt 66 and used to remotely tighten the bolt. The shear bolt 66 further comprises a flange 66d which extends axially from the bolt head. Flange 66d has an inner radius greater than the radius of hole 68 in the splice link. Thus, when shear bolt 66 is tightened, the flange 66d bears against the splice link 62. The inner perimeter of flange 66d is separated from the unthreaded portion 66b of the shear bolt shaft by a predetermined gap. As a result of this gap, an annular recess is formed between the shear bolt head 66a and the splice link 62.

After the shear bolt 66 has been tightened to the desired degree, the shear bolt is locked against rotation in the direction of loosening by a locking assembly which resides in the annular recess under the bolt head. In accordance with a preferred embodiment of the invention, the locking assembly comprises a ratchet lock washer 78 and a ratchet tooth washer 80 arranged in the annular recess as shown in FIG. 7.

Figure 9A:
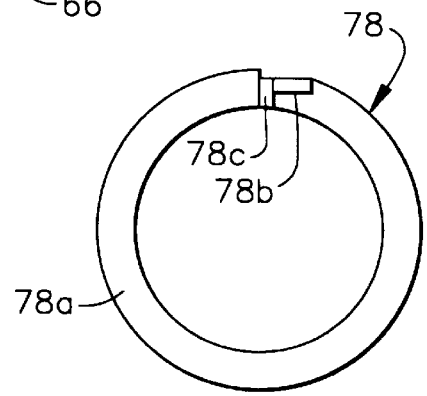
FIGS. 9A and 9B are schematics showing plan and side views, respectively, of a lock washer incorporated in the flexible link assembly shown in FIG. 7.
Figure 9B:
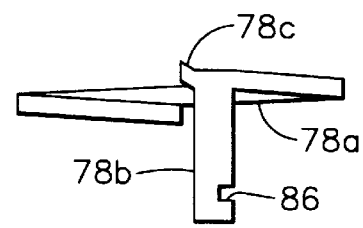

Referring to FIGS. 9A and 9B, the ratchet lock washer 78 comprises a spring 78a, a locking tang 78b integrally joined to one end of spring 78a and a locking tooth 78c integrally joined to the same end of spring 78a. The lock washer 78 is fabricated with the locking tang 78b disposed horizontally. Thereafter, the tang is bent 90°, to the position shown in FIG. 9B. The ratchet lock washer 78 is installed so that the spring 78a and locking tooth 78c reside in the annular recess under the shear bolt head 66a, while the locking tang 78b penetrates an axial hole 82 formed in the bolt head.

Figure 10A:
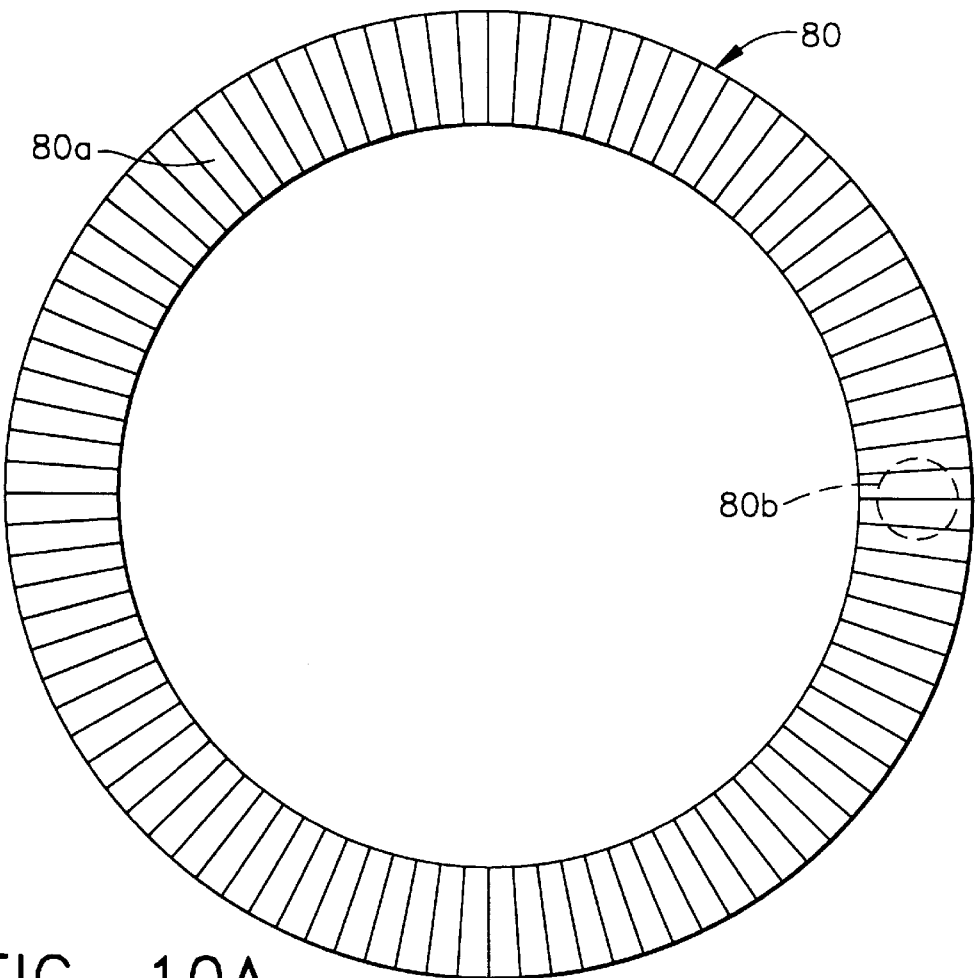
FIGS. 10A and 10B are schematics showing plan and side views, respectively, of a ratchet tooth washer incorporated in the flexible link assembly shown in FIG. 7.
Figure 10B:
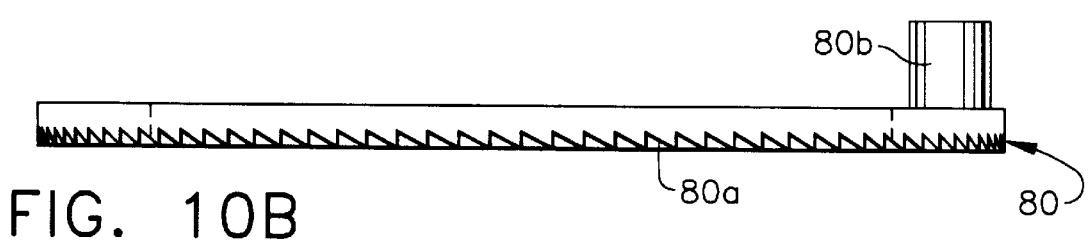

A ratchet tooth washer 80 also resides inside the annular recess under the bolt head. As seen in FIGS. 10A and 10B, the ratchet tooth washer 80 is a flat annular ring having a multiplicity of radially oriented teeth 80a circumferentially distributed on one side thereof. The ring surrounds the entrance to hole 64 in the splice link 62. A locking pin 80b extends axially from the opposite side of the washer and is configured to fit snugly inside a blind hole 84 drilled in the splice link 62. The ratchet tooth washer 80 is installed in the annular recess with minimal play to ensure against translation of the ratchet tooth washer 80 in a plane perpendicular to the axis of the bolt shaft. The en-gagement of pin 80b in blind hole 84 prevents rotation of the ratchet tooth washer 80 about the shaft axis.

Figure 8:
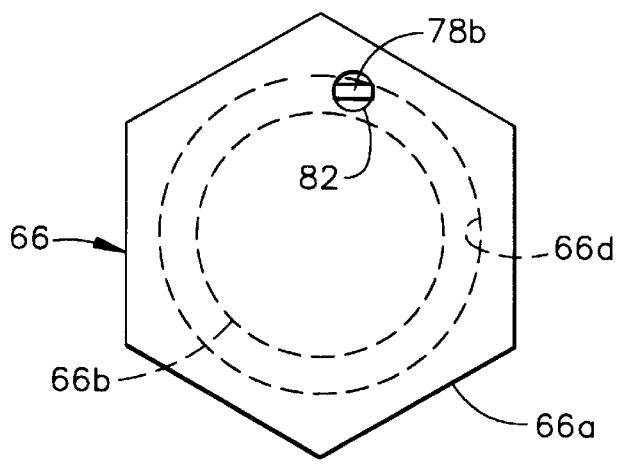
FIG. 8 is a schematic showing a plan view of the head of the shear bolt incorporated in the flexible link assembly shown in FIG. 7.

In the locking position, tang 78b extends into and through hole 82 in the bolt head 66b and the locking tooth 78c meshes with the ratchet teeth 80a formed on the ratchet tooth washer 80. The hole 82 communicates with the annular recess between the bolt shaft 66a and the flange 66d, as seen in FIG. 8. The ratchet teeth 80a are configured to allow the locking tooth 78c to slide over the ratchet teeth as the shear bolt rotates in the direction of tightening, while providing a positive lock against bolt rotation in the loosening direction.

As seen in FIG. 9A, spring 78a consists of one turn of a flat coil. During tightening of the shear bolt, the spring is compressed so that the locking tooth engages the ratchet teeth with a preload. Because the locking assembly resides in the annular recess between bolt shaft 66a and flange 66d, the bearing area for the structural load path of the shear bolt, i.e., the area of contact between flange 66d and splice link 62, is separate from the bearing area of the lock washer 78. As a consequence, the main load path does not go through the lock washer. The lock washer is free to flex independent of the bolt, allowing it to follow or cam against the ratchet teeth contour during rotation without resulting in variation of the bolt-applied preload.

The outer radius of spring 78a is slightly less than the inner radius of flange 66d. This snug fit causes the spring to bear against the built-in washer if the coil is flexed radial outward, e.g., as a result of the shear bolt 66 being urged to rotate in the direction of bolt loosening. The interference of the flange 66d blocks further radially outward expansion of the spring and, as a consequence, blocks further bolt rotation in the direction of bolt loosening.

The distal end of the locking tang 78b protruding out of the shear bolt head 68b serves as an indicator that the shear bolt is locked against rotation in the direction of bolt loosening. To test the locking status, the tang distal end is pulled outward. If the tang resists outward deflection with resilience, this indicates that the spring is supported between the bolt head and the ratchet lock washer. If the tang does not resist outward deflection, then the spring is loose inside the annular recess and the locking tooth is not meshed with the ratchet teeth, indicating that the shear bolt is not locked or the lock washer needs to be replaced.

The locking tang 78b is provided with a recess 86 formed in a distal portion of the tang that protrudes beyond the plane of the bolt head 66b. The recess 86 enables the distal end of tang 78b to be grasped by a suitable tool. When the tang is pulled axially away from the ratchet teeth 80a, the locking tooth 78c can be disengaged from the ratchet teeth, freeing the shear bolt 66 for rotation relative to the splice plate 62 in the direction of bolt loosening. The connection of the locking tang 78b to the end of the spring which carries the locking tooth 78c allows the shear bolt 66 to be loosened without damaging the ratchet lock washer 78 or ratchet tooth washer 80.

In accordance with a variation of the ratchet lock washer, the locking tang can be connected to the end of the spring opposite to the end that carries the locking tooth while still protruding through the head of the shear bolt. If the tang resists inward deflection with resilience, this indicates that the spring is supported between the bolt head and the ratchet lock washer. If the tang does not resist inward deflection, then the spring is loose inside the annular recess and the locking tooth is not meshed with the ratchet teeth, indicating that the shear bolt is not locked.

In accordance with a further variation of the locking assembly, the ratchet tooth washer can be eliminated and the ratchet teeth can be machined into the splice plate along the perimeter of the entrance to hole 68.

In accordance with the preferred embodiment of the invention, the nut and splice links and the shear bolts are made of Ni-Cr-Fe alloy X-750 or other high-strength alloy with suitable fluence relaxation and corrosion resistance properties in the BWR environment.

The above-described restraint apparatus restrains a cracked shroud against vertical joint separation by applying a thermal preload which is the result of differential thermal expansion of the restraint apparatus and the shroud. A desired differential thermal expansion preload can be attained by the selection of appropriate coefficients of thermal expansion of the materials. For example, a typical shroud is made of (Type 304 stainless steel having a mean coefficient of thermal expansion $\alpha_{304SS}=9.42\times10^{-6}$ inch/inch/° F. In contrast, the restraint assembly in accordance with a preferred embodiment of the invention comprises links made of Ni-Cr-Fe alloy X-750, having a mean coefficient of thermal expansion $\alpha_{X-750}=7.50\times10^{-6}$ inch/inch/° F. By proper structural design of the foregoing components, a differential thermal expansion, corresponding to a desired thermal preload to be applied to the shroud by the restraint apparatus, can be achieved. The thermal preload must be sufficient to counteract the separating forces exerted on a cracked shell section by the pressure differential between the inside and outside of the shroud.

For each installation, the magnitude of the thermal preload applied through differential thermal expansion will be a function of the respective coefficients of thermal expansion, the respective temperature increases, the distance bridged by the links and the spring constant of the links. It is also necessary to apply sufficient load to account for thermal and neutron fluence-induced relaxation of the ring material. The thermal preload and tensile stress on the links can be determined in each case using structural design and analysis techniques.

The flexible links are installed with relatively low mechanical loads, assuring they are held in place during plant heatup. The link thermal preload is applied during plant heatup to operating temperature, due to differential thermal expansion of the core shroud and the flexible link assembly when the reactor changes from a cold shutdown state to a hot operating state in which nuclear heat is generated. The differential thermal expansion occurs because the flexible links are made of material (e.g., Ni-Cr-Fe alloy Inconel X-750) having a coefficient of thermal expansion which is less than a coefficient of thermal expansion of the shroud material (e.g., Type 304 stainless steel). This gives an operating load sufficient to prevent vertical cracked shroud joints from separating. The significant forces to be reacted at a cracked weld by the flexible link assembly are seismic vertical shear load, pressure (hoop tension) load from core flow or loss-of-coolant accidents (LOCAs) and thermal expansion. Vertical shear load at a cracked weld is reacted by the friction between the mating surfaces which are compressed together by the preload tension in the link.

The link assemblies are fabricated entirely from Inconel Alloy X-750 or other high-strength alloy with suitable fluence relaxation and corrosion resistance properties in the BWR environment. No welding is required during fabrication or installation. This avoids weld residual stress and heat affected zones such as contribute to cracking in the reactor environment. For example, the links can be fabricated from Alloy X-750 (Ni-Cr-Fe) material that has been heat treated at 1975±25° F. followed by air cooling and age hardening after machin-ing to increase its strength. Alloy X-750 has high strength and its coefficient of thermal expansion is less than that of the shroud material. Alloy X-750 is resistant to IGSCC at the stress levels the components will experience during operation. Alternatively, links can be fabricated from a high-strength stainless steel material having a coefficient of thermal expansion closer to that of the shroud, if the link assemblies are installed with a large mechanical tensioning.

In accordance with the exemplary repair installation shown in FIG. 4, the link assemblies were installed with a small mechanical tensile preload, which assures that all components are tight after installation and during cold shutdown. The link assemblies are locked in place with mechanical devices. Thus, loose parts cannot occur without the failure of a locking device.

To mitigate conditions conducive to stress corrosion cracking of the shroud in the vicinity of the holes 70, the shear bolts can be coated with a noble metal (e.g., platinum or palladium) or made from material alloyed or doped with a noble metal. The noble metal will catalyze the recombination of water, thereby reducing the susceptibility of the shroud material to stress corrosion cracking. As used herein, the term "noble metal" includes platinum group metals and mixtures thereof.

The preferred embodiments of the invention have been disclosed for the purpose of illustration. Variations and modifications of the disclosed structures which do not depart from the concept of this invention will be readily apparent to mechanical engineers skilled in the art of nuclear reactor construction. For example, provided that the inside of the shroud is configured to allow access to the bolt head by a bolt torquing tool, it should be apparent that instead of installing the nut link inside the shroud and the splice link outside the shroud, the positions of the links can be reversed. All such variations and modifications are intended to be encompassed by the claims set forth hereinafter.

I claim:

1. A repaired core shroud of a light water nuclear reactor, comprising:

first and second shroud sections joined by a seam weld, said first shroud section having a first hole and said second shroud section having a second hole;

a first link arranged on one side of said first and second shroud sections and having a first hole which is aligned with said first hole in said first shroud section and a second hole which is aligned with said second hole in said second shroud section;

a second link arranged on another side of said first and second shroud sections and having a first threaded hole which is aligned with said first hole in said first shroud section and a second threaded hole which is aligned with said second hole in said second shroud section;

a first bolt having a portion which penetrates said first hole of said first shroud section and said first hole of said first link and having a threaded portion which threadably engages said first threaded hole in said second link; and a second bolt having a portion which penetrates said second hole of said second shroud section and said second hole of said first link and having a threaded portion which threadably engages said second threaded hole in said second link.

2. The repaired shroud as defined in claim 1, wherein said first and second shroud sections are made of a first material having a first coefficient of thermal expansion, and said first and second links are made of a second material having a second coefficient of thermal expansion, said second coefficient of thermal expansion being less than said first coefficient of thermal expansion.

3. The repaired shroud as defined in claim 1, wherein said first link comprises a main segment extending from said first hole to said second hole, and said main segment has a configuration which is designed to flex under tension applied by said first and second bolts, said flexure being in a plane generally perpendicular to said first and second bolts.

4. The repaired shroud as defined in claim 3, wherein said main segment of said first link has a dog-leg shape.

5. The repaired shroud as defined in claim 1, wherein said second link comprises a main segment extending from said first threaded hole to said second threaded hole, and said main segment has a configuration which is designed to flex under tension applied by said first and second bolts, said flexure being in a plane generally perpendicular to said first and second bolts.

6. The repaired shroud as defined in claim 5, wherein said main segment of said second link has a dog-leg shape.

7. The repaired shroud as defined in claim 1, wherein said first link comprises a first bearing pad formed on a perimeter of said first hole and in contact with said first shroud section, and a second bearing pad formed on a perimeter of said first hole and in contact with said second shroud section.

8. The repaired shroud as defined in claim 1, wherein said second link comprises a first bearing pad formed on a perimeter of said first threaded hole and in contact with said first shroud section, and a second bearing pad formed on a perimeter of said first threaded hole and in contact with said second shroud section.

9. An assembly for splicing two plates together in abutting relationship, each plate having a hole therein, comprising:

a first link arranged on one side of the abutting plates and having a first hole which is aligned with the hole in one plate and a second hole which is aligned with the hole in the other plate;

a second link arranged on the other side of the abutting plates and having a first threaded hole which is aligned with said first hole of said first link and a second threaded hole which is aligned with said second hole in said first link;

a first bolt comprising a first shaft portion which penetrates the hole in one plate and said first hole of said first link, and a threaded second shaft portion which threadably engages said first threaded hole in said second link; and a second bolt comprising a first shaft portion which penetrates the hole in the other plate and said second hole of said first link, and a threaded second shaft portion which threadably engages said second threaded hole in said second link.

10. The splicing assembly as defined in claim 9, wherein said first and second links are made of a material having a coefficient of thermal expansion which is less than the coefficient of thermal expansion of the plate material.

11. The splicing assembly as defined in claim 9, wherein said first link comprises a main segment extending from said first hole to said second hole, and said main segment has a configuration which is designed to flex under tension applied by said first and second bolts, said flexure being in a plane generally perpendicular to said first and second bolts.

12. The splicing assembly as defined in claim 11, wherein said main segment of said first link has a dog-leg shape.

13. The splicing assembly as defined in claim 9, wherein said second link comprises a main segment extending from said first threaded hole to said second threaded hole, and said main segment has a configuration which is designed to flex under tension applied by said first and second bolts, said flexure being in a plane generally perpendicular to said first and second bolts.

14. The splicing assembly as defined in claim 13, wherein said main segment of said second link has a dog-leg shape.

15. The splicing assembly as defined in claim 9, wherein each of said first and second bolts comprises:

a head; a shaft connected to said head and comprising said first shaft portion, said threaded second shaft portion and a third shaft portion; and a built-in washer extending axially from a perimeter of said head and encircling said third shaft portion to form an annular recess between said built-in washer and said third shaft portion.

16. The splicing assembly as defined in claim 15, wherein said head has a hole which communicates with said annular recess, and further comprising a circular array of ratchet teeth and a lock washer comprising a spring coil, a first projection for meshing with first and second ratchet teeth of said array of ratchet teeth and a second projection for engaging said hole in said head, wherein said first projection slides over said first ratchet tooth as said bolt is rotated in a direction of bolt tightening and said first projection is blocked by said second ratchet tooth as said bolt is urged to rotate in a direction opposite to said direction of bolt tightening.

17. The splicing assembly as defined in claim 16, wherein said first and second projections are connected to a same end of said spring coil, and said second projection has a distal end with a recess located outside said head.

18. The splicing assembly as defined in claim 16, further comprising a ratchet tooth washer having said circular array of ratchet teeth formed on one side thereof and a pin extending from another side thereof, wherein said ratchet teeth extend into said annular recess and said pin extends out of said annular recess and into a blind hole in the adjacent plate.

19. A repaired core shroud of a light water nuclear reactor, comprising:

first and second shroud sections joined by a seam weld, said first shroud section having a first hole and said second shroud section having a second hole;

a first link arranged on one side of said first and second shroud sections;

a second link arranged on another side of said first and second shroud sections;

a first member having a first portion penetrating said first hole of said first shroud section, a second portion in contact with said first link and a third portion in contact with said second link; and a second member having a first portion penetrating said second hole of said second shroud section, a second portion in contact with said first link and a third portion in contact with said second link, wherein said first and second shroud sections are made of a first material having a first coefficient of thermal expansion, and said first and second links are made of a second material having a second coefficient of thermal expansion, said second coefficient of thermal expansion being less than said first coefficient of thermal expansion.

* * * * *